United States Patent
Park et al.

(10) Patent No.: US 10,407,104 B2
(45) Date of Patent: Sep. 10, 2019

(54) INTEGRAL TYPE HOT-STAMPING VEHICLE BODY STRUCTURE AND VEHICLE APPLYING THE SAME

(71) Applicants: Hyundai Motor Company, Seoul (KR); Kia Motors Corporation, Seoul (KR)

(72) Inventors: Jun-Gyoo Park, Seongnam-si (KR); Seok Oh, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 282 days.

(21) Appl. No.: 15/298,481

(22) Filed: Oct. 20, 2016

(65) Prior Publication Data
US 2017/0233007 A1    Aug. 17, 2017

(30) Foreign Application Priority Data
Feb. 17, 2016    (KR) .................. 10-2016-0018348

(51) Int. Cl.
| B62D 25/02 | (2006.01) |
| B62D 25/04 | (2006.01) |
| B62D 27/02 | (2006.01) |
| B62D 29/00 | (2006.01) |

(52) U.S. Cl.
CPC .......... B62D 25/025 (2013.01); B62D 25/04 (2013.01); B62D 27/023 (2013.01); B62D 29/007 (2013.01); *B62D 25/02* (2013.01)

(58) Field of Classification Search
CPC .... B62D 25/025; B62D 25/04; B62D 27/023; B62D 29/007

USPC ............... 296/193.06, 203.03, 193.05, 187.1
See application file for complete search history.

(56) References Cited

U.S. PATENT DOCUMENTS

| 5,653,495 A * | 8/1997 | Bovellan | B62D 21/15 296/187.1 |
| 6,053,564 A * | 4/2000 | Kamata | B62D 21/09 296/187.09 |
| 8,888,173 B2 * | 11/2014 | Nydam | B62D 25/025 296/187.12 |
| 2012/0119546 A1 * | 5/2012 | Honda | B62D 25/025 296/203.01 |
| 2013/0200650 A1 * | 8/2013 | Matsuoka | B62D 21/155 296/187.1 |

FOREIGN PATENT DOCUMENTS

| JP | 2573686 Y2 | 3/1998 |
| JP | 2008-213826 A | 9/2008 |
| JP | 2014-080182 A | 5/2014 |
| KR | 20-1997-0017610 U | 5/1997 |
| WO | WO 2013/077083 A1 | 5/2013 |
| WO | WO 2013/077084 A1 | 4/2015 |

* cited by examiner

*Primary Examiner* — Joseph D. Pape
(74) *Attorney, Agent, or Firm* — Morgan, Lewis & Bockius LLP

(57) ABSTRACT

An integral hot-stamping vehicle body structure may include an integral hot-stamping panel separated into an A pillar section forming an A pillar, a B pillar section forming a B pillar, and a C pillar section forming a C pillar, and forming a side sill with lower portions of the A pillar section, the B pillar section, and the C pillar section, and a joint member disposed on the A pillar section and occupying an open front joint space in the A pillar section.

13 Claims, 5 Drawing Sheets

SECTION B-B

SECTION B-B

"A" PERSPECTIVE VIEW

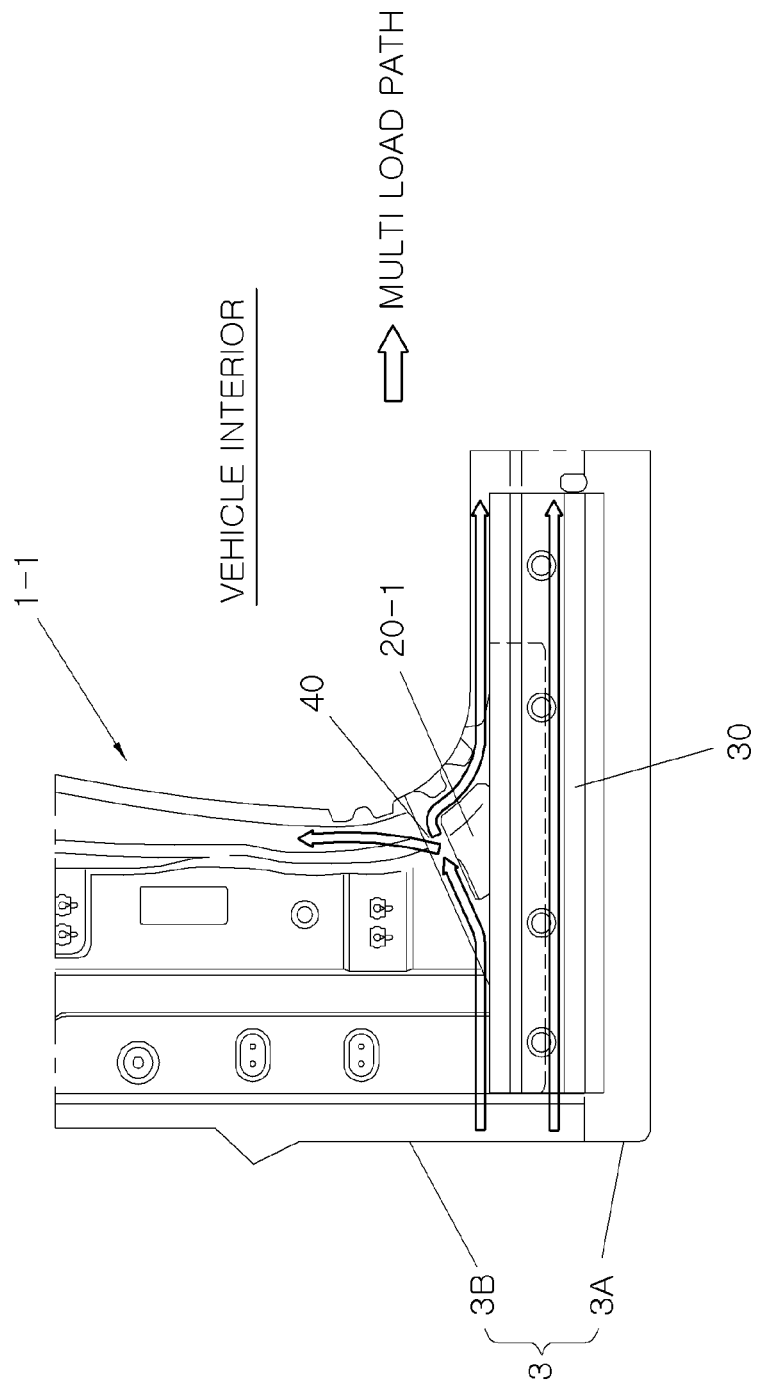

INTEGRAL TYPE HOT-STAMPING VEHICLE BODY STRUCTURE AND VEHICLE APPLYING THE SAME

CROSS-REFERENCE TO RELATED APPLICATION

The present application claims priority to Korean Patent Application No. 10-2016-0018348, filed Feb. 17, 2016, the entire contents of which is incorporated herein for all purposes by this reference in its entirety.

BACKGROUND OF THE INVENTION

Field of the Invention

The present invention relates to an integral type hot-stamping vehicle body, and more particularly, to an integral hot-stamping vehicle body structure which is able to respond to small overlap collision through rigidity and strength of a closed section structure and a vehicle applying the same.

Description of Related Art

Generally, weight reduction of a vehicle body comprising a frame of a vehicle is one of main technologies for enhancing fuel efficiency.

One example of vehicle bodies applying the technology for reducing weight of the vehicle body is an integral type hot-stamping vehicle body structure to which reinforcement members of side structures are integrally formed. Herein, the hot stamping process is a method for forming a plurality of components into one component by using a press mold, and the method is suitable to forming structural members and impact members for a vehicle.

Therefore, the integral type hot-stamping vehicle body structure is configured so that a side sill and a lower end portion of a front pillar (in general, A-pillar) are formed to an integral type hot-stamping panel, the integral type hot-stamping panel is applied to a front joint of a vehicle body. Consequently, the integral type hot-stamping vehicle body structure is able to reduce in weight about 5 kg in comparison with a structure which is configured to separate a side sill, a lower end portion of a front pillar, and an upper end portion of a front pillar.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

The integral hot-stamping vehicle body structure may be structurally disadvantageous to ensure rigidity and strength of a front vehicle body as a cross section structure surrounding a space of a front joint formed by an integral hot-stamping panel and a side inner is cut, and the cut cross section structure is impossible to form a closed section structure.

Particularly, if rigidity and strength of the front vehicle body are not ensured, collapse of a side sill by knocking of a wheel/tire, an injury to a pelvic limb of a passenger by collapse of the side sill and invasion of the side sill toward an interior under a dashboard, excessive load to a coupling portion of the dashboard, and so on are likely to occur. Resultantly, the structure in which a closed section is not formed is disadvantageous to effectively absorb (or support) load of a front.

Besides, since a frontal crash safety evaluation relating to a small overlap of North America IIHS requires that a deformation of a passenger room is minimized, ensuring rigidity and strength of the integral hot-stamping front vehicle body structure is necessary to address the frontal crash safety evaluation relating to the small overlap of North America IIHS.

Various aspects of the present invention are directed to providing an integral hot-stamping vehicle body structure and a vehicle applying the same having advantages of ensuring rigidity and strength for effectively absorbing (or supporting) load as a closed section is formed by a joint member being provided to the front vehicle body integrating the side sill and the front pillar lower portion to one, and particularly satisfying the frontal crash safety evaluation relating the small overlap of North America IIHS as paths dispersing load are realized by the joint member.

According to various aspects of the present invention, an integral hot-stamping vehicle body structure may include an integral hot-stamping panel separated into an A pillar section forming an A pillar, a B pillar section forming a B pillar, and a C pillar section forming a C pillar, and forming a side sill with lower portions of the A pillar section, the B pillar section, and the C pillar section, and a joint member disposed on the A pillar section and occupying an open front joint space in the A pillar section.

The front joint space may be blocked by an A pillar side inner which is added on the A pillar section, and the joint member may occupy the front joint space so as to form a closed section.

The front joint space may be separated into a side sill joint space and a pillar lower end joint space, and the closed section may be formed in the side sill joint space.

The joint member may include an inner bracket and an outer bracket forming the closed section into dual closed sections.

The dual closed sections may be separated into an upper closed section which is formed by an upper portion of the outer bracket and the inner bracket, and a lower closed section which is formed by a lower portion of the outer bracket, the A pillar section, and a bottom portion of an A pillar side inner.

The inner bracket may have a flat body shape formed in a straight line shape, and the outer bracket has a space body shape formed in a "U" shape.

A short end flange and a long end flange may be formed at the flat body by bending both ends of the flat body toward opposite directions from each other, an upper end flange and a lower end flange may be formed at the space body by bending both ends of the space body toward opposite directions from each other, and the short end flange, the long end flange, the upper end flange, and the lower end flange may be formed as welding portions.

The inner bracket may be configured with an extended bracket formed at the flat body.

The outer bracket may be configured with a plurality of holes bored in the space body.

The joint member may further include a guide bracket positioned toward an inner bracket of the joint member, and the guide bracket may disperse small overlap impact being applied to the A pillar section.

The guide bracket may be slanted to make an acute angle in an upward direction with respect to an upper surface of a flat body of the inner bracket.

The guide bracket may be formed as a rectangular body, and side flanges thereof, which are bent at 90 degrees at each of four sides, may be formed as welding portions.

A slot may be bored at the rectangle body.

According to various aspects of the present invention, a vehicle may include an integral hot-stamping vehicle body which includes an integral hot-stamping panel separated into an A pillar section forming an A pillar, a B pillar section forming a B pillar, and a C pillar section forming a C pillar, and forming a side sill at lower portions thereof, and a joint member dually forming closed sections in a front joint space of the A pillar section on which an A pillar side inner is added, in which the integral hot-stamping vehicle body may be applied to a side frame of the vehicle.

Various embodiments of the present invention provide the integral hot-stamping vehicle body structure as the joint member forming the closed section and the paths dispersing load is applied to the side sill and the front pillar lower portion being integrated as one component, and have the following merits and effects.

Firstly, when knocking of a wheel/tire occurs, the collapse degree of a side sill is greatly decreased. Secondly, together with the improvement about collapse of the side sill, an invasion degree of the side sill toward an interior of a vehicle under a dashboard is greatly decreased such that an injury to a right pelvic limb of a passenger rarely occurs. Thirdly, the excessive load concentration to a coupling portion of the dashboard is greatly reduced. Fourthly, the frontal crash safety evaluation about the small overlap of North America IIHS is easily satisfied.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 illustrates paths dispersing load, which is formed as multi load paths of the joint member according to various embodiments of the present invention when a vehicle collides in a small overlap state.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
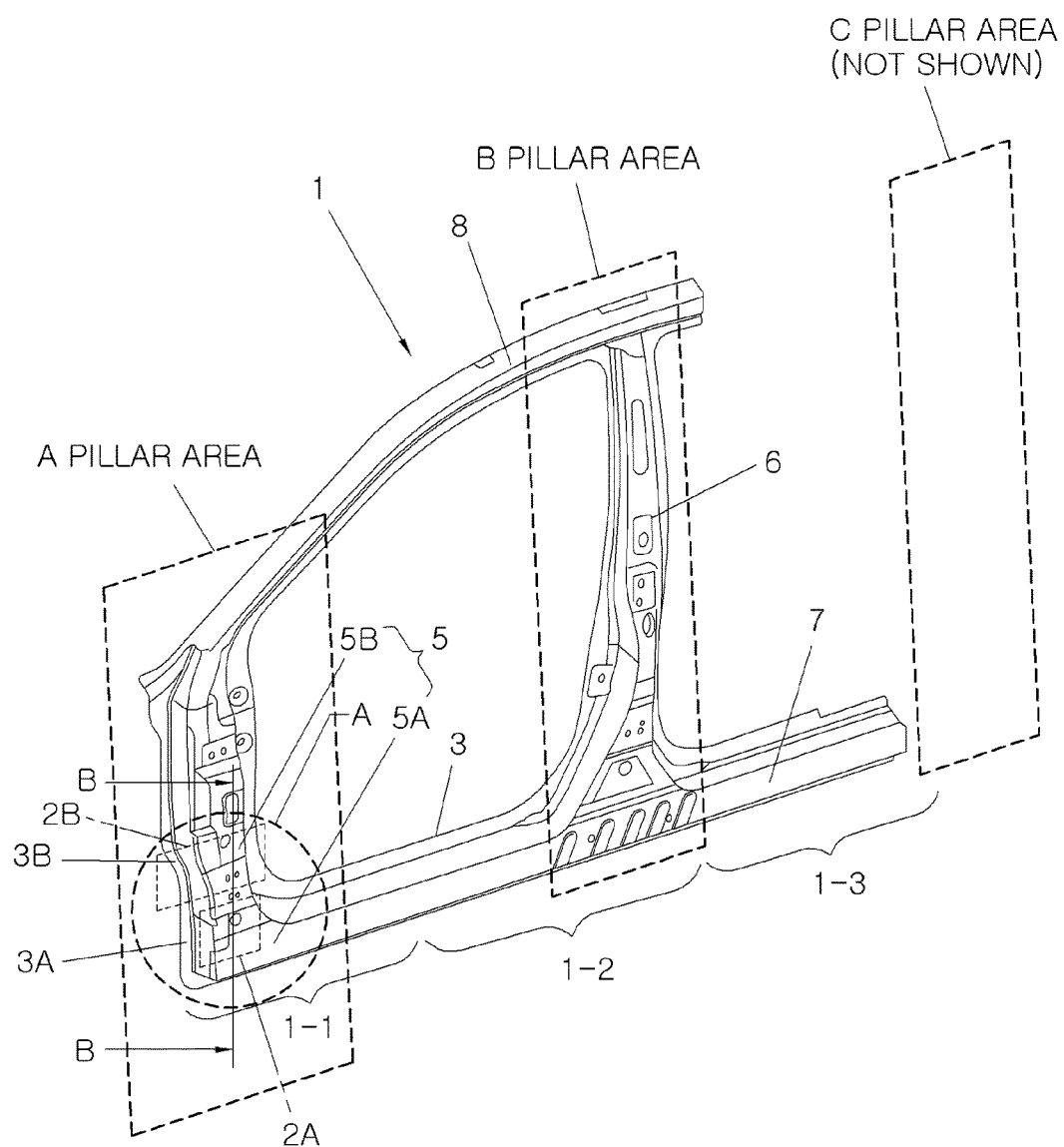
FIG. 1 is an appearance perspective view of an integral hot-stamping vehicle body structure for responding a small overlap crash according to various embodiments of the present invention.
Figure 2:
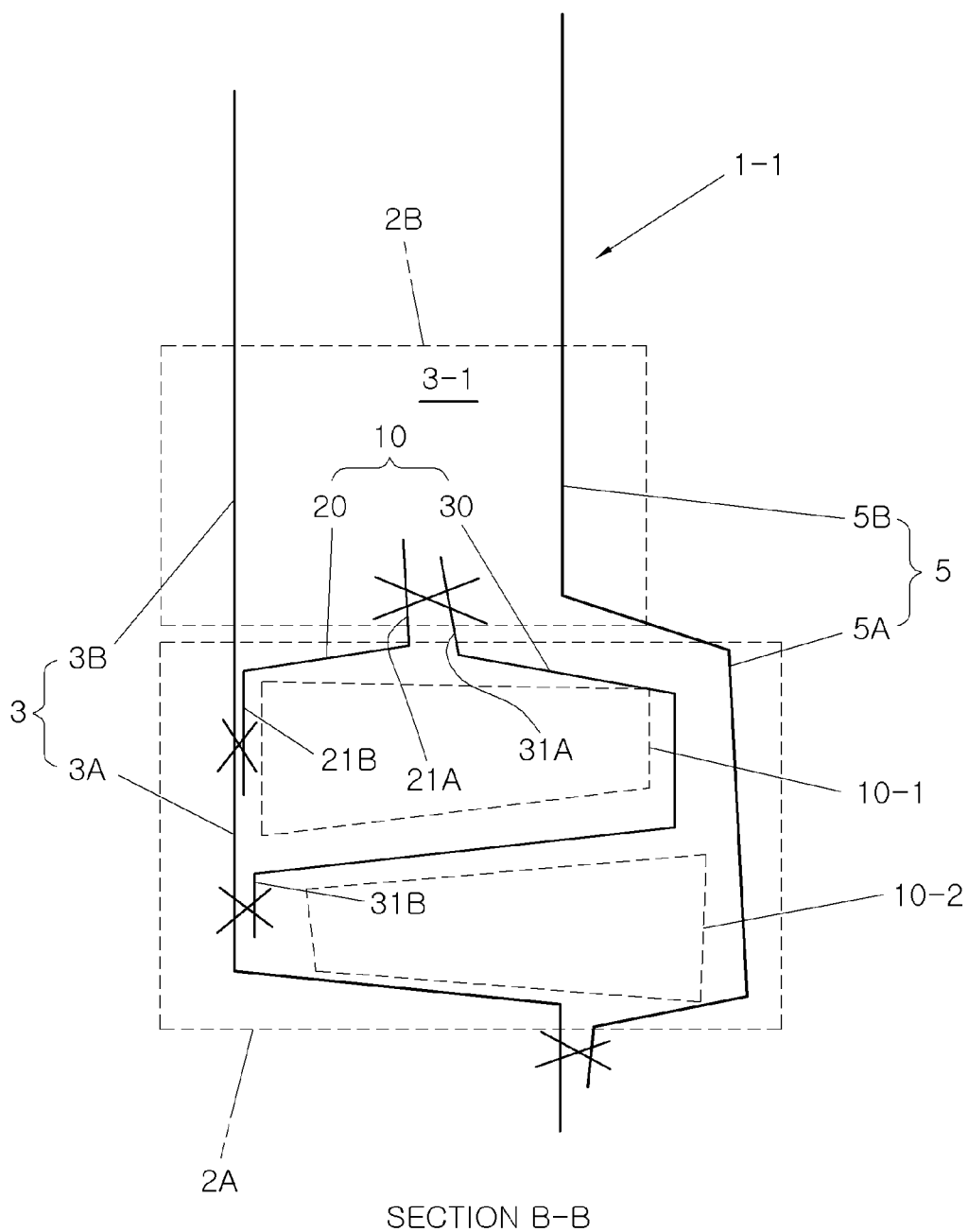
FIG. 2 is a cross sectional schematic diagram of a small overlap front vehicle body ensuring rigidity and strength by a joint member according to various embodiments of the present invention.
Figure 3:
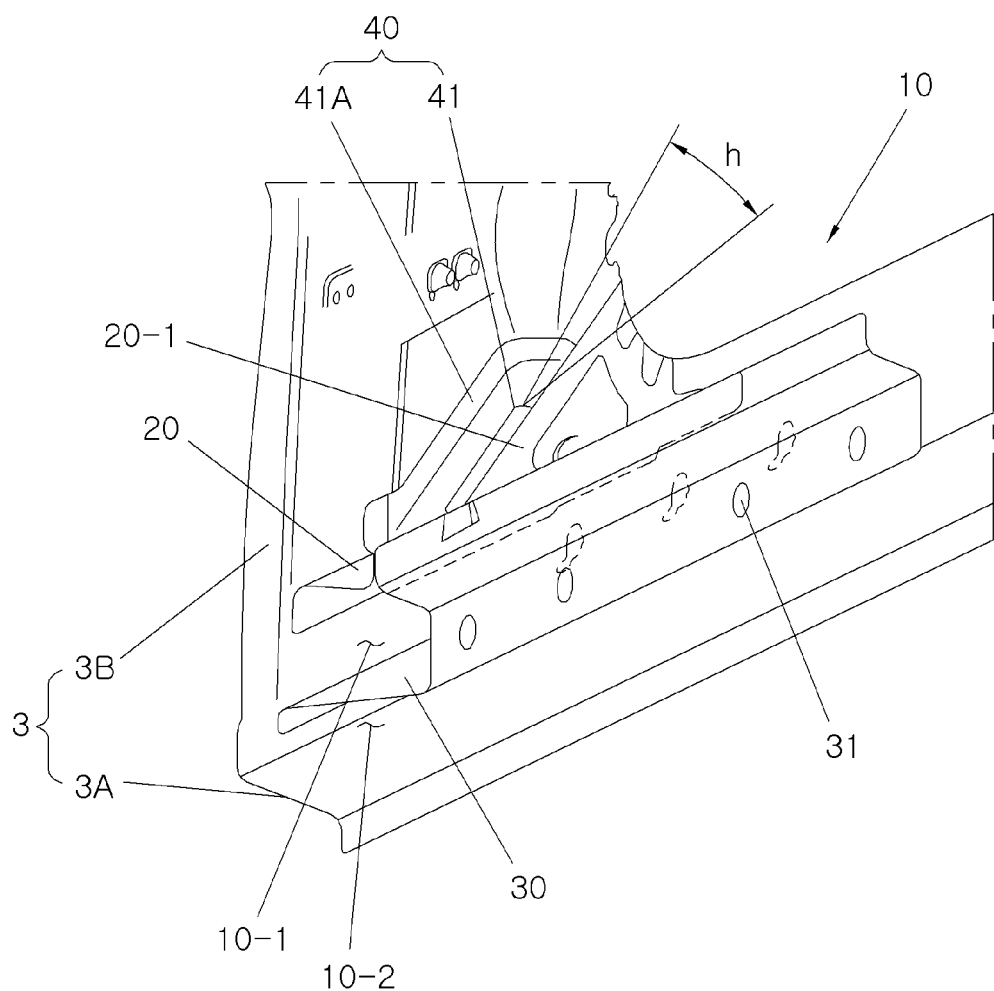
FIG. 3 is a partial perspective view of a small overlap front vehicle body forming paths dispersing load by a joint member according to various embodiments of the present invention.

FIG. 1, FIG. 2 and FIG. 3 represent an integral hot-stamping vehicle body structure for responding a small overlap according to various embodiments of the present invention.

Referring to FIG. 1, an integral hot-stamping vehicle body 1 is separated with an integral hot-stamping panel 3, side inner panels 5, 6, and 7, a roof rail panel 8.

For example, the integral hot-stamping panel 3 may form a lower end portion (in a vertical direction) to a side sill and may form a front portion, a central portion, and a rear portion (in a horizontal direction) to an A pillar area, a B pillar area, and a C pillar area, respectively. The side inner panels 5, 6, and 7 may be separated into a front pillar side inner 5, a middle pillar side inner 6, and a rear pillar side inner 7, and the A pillar side inner 5, the B pillar side inner 6, and the rear pillar side inner 7 may be sequentially assembled to the A, B, and C pillars 1-1A, 1-2A and 1-3A (see FIG. 4) and the side sill by welding so as to be integrated with the integral hot-stamping panel 3. The roof rail panel 8 may be assembled to an upper end portion (in a vertical direction) of the integral hot-stamping panel 3 so as to be integrated with the integral hot-stamping panel 3.

As a result, the integral hot-stamping vehicle body 1 may form an integral vehicle side frame in which the integral hot-stamping panel 3, the front, middle and rear pillar side inner panels 5, 6, and 7, and roof rail panel 8 are integrated by welding. Therefore, the integral hot-stamping vehicle body 1 may be separated into an A pillar section 1-1 which forms the A pillar extended toward a front of the vehicle, a C pillar section 1-3 which forms the C pillar extended toward a rear of the vehicle, and a B pillar section 1-2 which forms the B pillar by being positioned between the front and the rear of the vehicle. The A pillar section 1-1 and the B pillar section 1-2 may be provided to a space in which a front door is mounted, and the B pillar section 1-2 and the C pillar section 1-3 may be provided to a space in which a rear door is mounted. Particularly, lower portions of the A pillar section 1-1, the B pillar section 1-2, and the C pillar section 1-3 may be formed as the side sill.

Referring to FIG. 2, the A pillar section 1-1 may be separated into the integral hot-stamping panel 3 and the A pillar side inner 5. The integral hot-stamping panel 3 may be separated into a side sill portion 3A and a pillar lower portion 3B, and the A pillar side inner 5 may be separated into a side sill overlap portion 5A and a pillar lower overlap portion 5B. Herein, the side sill portion 3A and the pillar lower portion 3B are parts of the integral hot-stamping panel 3. As a result, the side sill portion 3A and the side sill overlap portion 5A form a side sill joint space 2A, and the pillar lower portion 3B and the pillar lower overlap portion 5B form a pillar lower joint space 2B, and the side sill/pillar lower joint space 2A and 2B form a front joint space 3-1 at the A pillar section 1-1.

Particularly, a joint member 10 may be disposed in the side sill joint space 2A of the front joint space 3-1, and as the joint member 10 ensures rigidity and strength of a front vehicle body being required to the A pillar section 1-1.

Concretely, the joint member 10 may include an inner bracket 20 and an outer bracket 30, and the inner bracket 20 may be welded to the side sill portion 3A so as to occupy the side sill joint space occupy, and the outer bracket 30 may be welded to the inner bracket 20 and the side sill portion 3A so as to partition the side sill joint space to dual spaces. The dual spaces may include an upper closed section 10-1 which forms a closed section by the inner bracket 20 in an upper of the outer bracket 30 and a lower closed section 10-2 which forms a closed section by the side sill portion 3A and the side sill overlap portion 5A in a lower of the outer bracket 30. Therefore, the upper closed section 10-1 may be formed by an upper portion of the outer bracket 30 and the inner bracket 20, and the lower closed section 10-2 is formed by a lower portion of the outer bracket 30, the A pillar section 1-1, and a bottom portion of the A pillar side inner 5.

For example, the inner bracket 20 may be formed by a flat body having a straight line shape and a short end flange 21A and a long end flange 21B which are formed by bending both ends of the flat body toward opposite directions from each other. The bent length of the short end flange 21A may be shorter than that of the long end flange 21B. The short end flange 21A may be welded to the outer bracket 30 and the long end flange 21B is welded to the side sill portion 3A so as to be fixed to the integral hot-stamping panel.

For example, the outer bracket 30 may be formed by a space body having a "U" shape and an upper end flange 31A and a lower end flange 31B which are formed by bending both ends of the space body toward opposite directions with each other. The upper end flange 31A may be welded with the short end flange 21A so as to be fixed to the inner bracket 20, and the lower end flange 31B is welded with the side sill portion 3A apart from the long end flange 311B so as to be fixed to the integral hot-stamping panel 3. Particularly, a protruded portion of the space body may be welded to the side sill overlap portion 5A so as to be fixed to the front side inner 5. However, the protruded portion of the space body may be not welded to the side sill overlap portion 5A so as to be disposed apart from the front side inner 5 when being required as shown in FIG. 2.

Referring to FIG. 3, the joint member 10 further may include a guide bracket 40, the guide bracket 40 may function together with the inner bracket 20 such that paths dispersing load for a small overlap form multi load paths. Therefore, the inner bracket 20 may form a multi load path, and simultaneously, disperse load to a vehicle body door opening portion (i.e., the A pillar section 1-1 and the B pillar section 1-2) so as to greatly reduce probability of occurrence of a welding point crack.

For example, the guide bracket 40 may be adapted so that one end thereof is fixed to an upper surface of the flat body of the inner bracket 20 by welding and the other end thereof is slanted to make an acute angle (h) in an upward direction so as to be fixed to a wall of the side sill portion 3A by welding. Herein, the slanted upward direction means a direction proceeded from the A pillar toward the B pillar. Therefore, the guide bracket 40 may be positioned in an inside space of the outer bracket 30.

Particularly, the inner bracket 20, the outer bracket 30, and the guide bracket 40 may include constituent elements for improving self-rigidity and strength.

Concretely, an extended bracket 20-1, which is extended in a triangle shape from the upper surface of the flat body, may be further formed at the inner bracket 20, and the extended bracket 20-1 may be fixed to the wall of the side sill portion 3A so as to intensify welding fixity of the inner bracket 20 and increase rigidity and strength of the inner bracket 20. Particularly, the extended bracket 20-1 may be welded to a side portion of guide bracket 40 so as to function as a medium for intensifying welding fixity of the guide bracket 40.

Concretely, a plurality of holes 31 may be bored with equal distance to a protruded surface of the space body in the outer bracket 30 such that weight is reduced and rigidity and strength responding to axial load is increased. Particularly, the outer bracket 30 may form a trapezoid shape that the "U" shape of the space body is wider toward outsides so as to extend a space of the lower closed section 10-2.

Concretely, the guide bracket 40 may be formed in a rectangle shape and may form side flanges 41A which are bent to make 90 degrees from four sides thereof, and the side flanges 41A may be fixed by welding, respectively, so as to intensify welding fixity. Particularly, a slot 41 may be bored to the rectangle body of the guide bracket 40 such that weight is reduced and rigidity and strength responding to axial load is increased.

Figure 4:
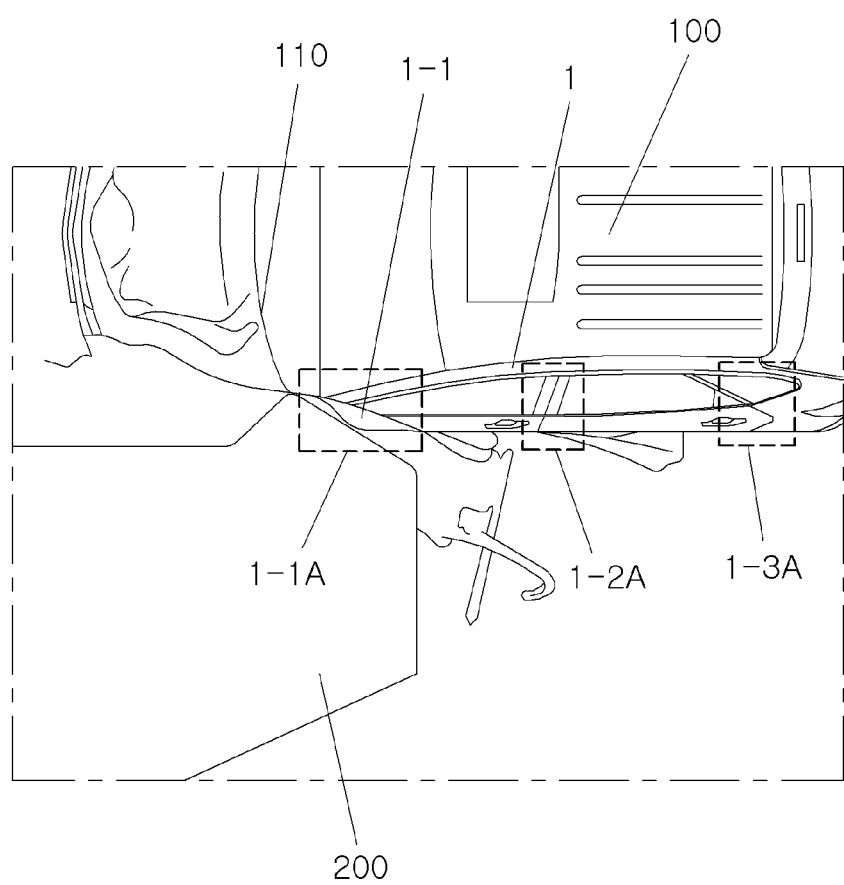
FIG. 4 shows a state of small overlap collision of a vehicle applying an integral hot-stamping vehicle body structure for responding a small overlap collision according to various embodiments of the present invention.

Meanwhile, FIG. 4 represents a state of small overlap collision of a vehicle 100 according to various embodiments. As shown, the vehicle 100 may apply the integral hot-stamping vehicle body 1 to a side frame of the vehicle body, and a dash panel 110, which partitions an engine compartment and an interior, may be applied to a front of the integral hot-stamping vehicle body 1. Therefore, the front (A pillar section 1-1) of the integral hot-stamping vehicle body 1 may be applied to the front joint to which the dash panel 110 is connected.

Particularly, the integral hot-stamping vehicle body 1 may apply the integral hot-stamping panel 3, and the joint member 10 may be applied to the A pillar section 1-1 of the Integral hot-stamping vehicle body 1. Herein, the integral hot-stamping vehicle body 1, the A pillar section 1-1, the integral hot-stamping panel 3, and the joint member 10 are same to constituent elements which are described referring to FIG. 1 to FIG. 3.

If the vehicle 100 collides to a barrier 200 with a small overlap, the A pillar section 1-1 of the integral hot-stamping vehicle body 1 maintains rigidity and strength resisting the small overlap impact by strong durability of the joint member 10 and simultaneously, realizes evasion conduct to respond a small overlap by dispersing small overlap load through multi load paths.

FIG. 5 illustrates paths dispersing load, which is formed as multi load paths of the joint member according to the present invention when a vehicle collides in a small overlap state.

As shown, small overlap impact is delivered through the inner bracket 20 and the outer bracket 30 so as to be divided toward a longitudinal direction (a length direction of the A pillar section 1-1) and simultaneously, is delivered through the extended bracket 20-1 and the guide bracket 40 so as to be divided toward an upward direction (a vertical direction of the A pillar section 1-1) such that load paths are formed by three parts. As a result, the A pillar section 1-1 maintains strong durability supporting small overlap impact by rigidity and strength being intensified by the upper/lower closed sections 10-1 and 10-2 of the joint member 10, and simultaneously, small overlap evasion conduct dispersing small overlap impact is realized.

As described above, the integral hot-stamping vehicle body structure for responding a small overlap according to various embodiments includes an integral hot-stamping panel 3 being separated into an A pillar section 1-1 forming an A pillar, a B pillar section 1-2 forming a B pillar, and a C pillar section 1-3 forming a C pillar so as to form a side sill at lower portions thereof, and a joint member 10 dually forming closed sections in a front joint space 3-1 of the A pillar section 1-1 on which an A pillar side inner 5 is overlapped, and the integral hot-stamping vehicle body 1 is applied to a side frame of the vehicle 100 such that concentrated load to a dash panel 110 is prevented, it is possible to ensure rigidity and strength for effectively absorbing (or supporting) load, and particularly, the frontal crash safety evaluation about the small overlap of North America IIHS is satisfied as paths dispersing load is realized by the joint member.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integral hot-stamped vehicle body structure comprising:
    an integral hot-stamped panel separated into an A pillar section forming an A pillar, a B pillar section forming a B pillar, and a C pillar section forming a C pillar, and forming a side sill with lower portions of the A pillar section, the B pillar section, and the C pillar section; and
    a joint member disposed on the A pillar section and occupying an open front joint space in the A pillar section,
    wherein the joint member comprises an inner bracket and an outer bracket forming a closed section into dual closed sections,
    wherein a first end flange of the inner bracket and a first end flange of the outer bracket are welded to a side of a pillar lower portion of the A pillar section to form a first fixed portion and a second fixed portion, respectively, and
    wherein a second end flange of the inner bracket and a second end flange of the outer bracket are connected to each other to form a third fixed portion positioned out of a space horizontally formed between the first and second fixed portions.

2. The integral hot-stamped vehicle body structure of claim 1, wherein the front joint space is blocked by a front pillar side inner which is added on the A pillar section, and the joint member occupies the front joint space to form the closed section.

3. The integral hot-stamped vehicle body structure of claim 2, wherein the front joint space is separated into a side sill joint space and a pillar lower end joint space, and the closed section is formed in the side sill joint space.

4. The integral hot-stamped vehicle body structure of claim 1, wherein the dual closed sections are separated into an upper closed section which is formed by an upper portion of the outer bracket and the inner bracket, and a lower closed section which is formed by a lower portion of the outer bracket, the front pillar section, and a bottom portion of an A pillar side inner.

5. The integral hot-stamped vehicle body structure of claim 1, wherein the inner bracket has a flat body formed in a straight line shape, and the outer bracket has a space body formed in a "U" shape.

6. The integral hot-stamped vehicle body structure of claim 5,
    wherein the first end flange and the second end flange of the inner bracket are formed at the flat body by bending both ends of the flat body toward opposite directions from each other;
    wherein the first end flange and the second end flange of the outer bracket are formed at the space body by bending both ends of the space body toward opposite directions from each other; and
    wherein the first end flange and the second end flange of the inner bracket, and the first end flange and the second end flange of the outer bracket, are formed as welding portions.

7. The integral hot-stamped vehicle body structure of claim 6, wherein the inner bracket is configured with an extended bracket formed at the flat body.

8. The integral hot-stamped vehicle body structure of claim 6, wherein the outer bracket is configured with a plurality of holes bored in the space body.

9. The integral hot-stamping vehicle body structure of claim 1, wherein the joint member further comprises a guide bracket positioned toward the inner bracket of the joint member, and the guide bracket disperses overlap impact being applied to the A pillar section.

10. The integral hot-stamped vehicle body structure of claim 9, wherein the guide bracket is slanted to make an acute angle in an upward direction with respect to the inner bracket.

11. The integral hot-stamped vehicle body structure of claim 9, wherein the guide bracket is formed as a rectangular body, which are bent at 90 degrees at each of four sides.

12. The integral hot-stamped vehicle body structure of claim 11, wherein a slot is bored at the rectangle body.

13. A vehicle comprising:
the integral hot-stamped vehicle body structure of claim 1,
wherein the integral hot-stamped vehicle body structure is applied to a side frame of the vehicle.

* * * * *